United States Patent
Tang et al.

(10) Patent No.: US 10,274,636 B2
(45) Date of Patent: Apr. 30, 2019

(54) X-RAY FLUOROSCOPIC IMAGING SYSTEM

(71) Applicants: NUCTECH COMPANY LIMITED, Beijing (CN); TSINGHUA UNIVERSITY, Beijing (CN)

(72) Inventors: Huaping Tang, Beijing (CN); Zhiqiang Chen, Beijing (CN); Chuanxiang Tang, Beijing (CN); Huaibi Chen, Beijing (CN); Yuanjing Li, Beijing (CN); Ziran Zhao, Beijing (CN); Yaohong Liu, Beijing (CN); Shangmin Sun, Beijing (CN); Xinshui Yan, Beijing (CN); Zhanfeng Qin, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 202 days.

(21) Appl. No.: 14/582,076

(22) Filed: Dec. 23, 2014

(65) Prior Publication Data
US 2015/0185356 A1    Jul. 2, 2015

(30) Foreign Application Priority Data

Dec. 30, 2013 (CN) .......................... 2013 1 0741677

(51) Int. Cl.
G01V 5/00 (2006.01)
G03C 9/00 (2006.01)
G01N 23/04 (2018.01)

(52) U.S. Cl.
CPC ............ *G01V 5/0016* (2013.01); *G01V 5/005* (2013.01); *G01V 5/0033* (2013.01); *G01V 5/0066* (2013.01)

(58) Field of Classification Search
CPC .... G01V 5/0016; G01V 5/0033; G01V 5/005; G01V 5/0066; G01V 5/0008;
(Continued)

(56) References Cited

U.S. PATENT DOCUMENTS 4,599,740 A    7/1986  Cable
4,731,807 A *  3/1988  Plessis .................. A61B 6/032
                                                  378/146
(Continued)

FOREIGN PATENT DOCUMENTS

CN    2572400 Y    9/2003
CN    2840027 Y    11/2006
(Continued)

OTHER PUBLICATIONS

The Extended Supplementary European Search Report received in the corresponding European application (EP 14200195.7).
(Continued)

*Primary Examiner* — Irakli Kiknadze
(74) *Attorney, Agent, or Firm* — Kilpatrick Townsend & Stockton LLP

(57) ABSTRACT

The present invention may perform fluoroscopic imaging simultaneously on the subjects in at least two channels using only one electron accelerator, at least two sets of X-ray beams and at least two sets of detector systems, through the design of the electron accelerator, the shielding and collimating device, the at least two detector arrays and various mechanical composite structures. The X-ray fluoroscopic imaging system according to the present invention may be designed in specific forms of a stationary type, an assembled type, a track mobile type or vehicular mobile type, etc., and has advantages such as simple structure, low cost, strong function, good image quality and the like.

23 Claims, 6 Drawing Sheets

(58) Field of Classification Search
CPC .. G01V 5/0041; G01V 5/0025; G01V 5/0091;
G01V 5/0058; G01V 5/0083; G01V 5/00;
H04Q 9/14; A61N 5/1049; G01N 23/043;
G01N 23/04; G01N 23/046; G01N
23/083; G01N 23/203; G01N 23/087;
G01N 2223/419; G01N 2223/612; G01N
2223/643; G01N 2021/0346; G01N
21/05; G01N 2223/3307; G01N
2223/423; G01N 2223/645; G01N
33/54373; G01T 7/08; G21K 1/025;
A61B 6/032; A61B 6/4007; A61B
6/4488; A61B 6/025; A61B 6/035; A61B
6/4014; A61B 6/4028; A61B 6/4078
USPC .............................. 378/57, 198, 189, 193, 42
See application file for complete search history.

(56) References Cited

U.S. PATENT DOCUMENTS

| | | | |
|---|---|---|---|
| 6,628,745 | B1 | 9/2003 | Annis et al. |
| 7,162,005 | B2 * | 1/2007 | Bjorkholm ........... G01V 5/0016 378/143 |
| 7,302,044 | B2 * | 11/2007 | Gabioud ................ H01J 35/08 378/125 |
| 7,957,505 | B1 * | 6/2011 | Katz ...................... G01B 15/00 378/147 |
| 9,223,049 | B2 * | 12/2015 | Kotowski .............. G01N 23/04 |
| 9,250,076 | B2 * | 2/2016 | Geelen ................ G01C 21/3635 |
| 2009/0116614 | A1 | 5/2009 | Kotowski et al. |
| 2010/0119038 | A1 | 5/2010 | Suyama et al. |
| 2010/0189226 | A1 * | 7/2010 | Kotowski .............. G01N 23/04 378/198 |
| 2012/0076257 | A1 * | 3/2012 | Star-Lack .............. G01V 5/005 378/4 |
| 2013/0028376 | A1 * | 1/2013 | Mastronardi ........ G01V 5/0008 378/57 |

FOREIGN PATENT DOCUMENTS

| | | |
|---|---|---|
| CN | 101210895 A | 7/2008 |
| CN | 101358936 A | 2/2009 |
| CN | 101866019 A | 10/2010 |
| CN | 203772764 U | 8/2014 |
| JP | 2004170393 A | 6/2004 |
| JP | 2005534151 A | 11/2005 |
| JP | 2006527368 A | 11/2006 |
| JP | 2008102136 A | 5/2008 |
| JP | 2008298509 A | 12/2008 |
| JP | 2009036769 A | 2/2009 |
| JP | 2009122108 A | 6/2009 |
| WO | 2004010162 A2 | 1/2004 |
| WO | 2005121756 A2 | 12/2005 |
| WO | 2011091070 A2 | 7/2011 |

OTHER PUBLICATIONS

European Patent Office Action dated Aug. 9, 2018 in the corresponding European application (application No. 14200195.7).
First Office Action dated Apr. 24, 2018 in the corresponding Japanese application (application No. 2014259043).

* cited by examiner

X-RAY FLUOROSCOPIC IMAGING SYSTEM

This application claims priority to Chinese Patent Application No. 201310741677.6, filed with the Chinese Patent Office on Dec. 30, 2013, which is incorporated herein by reference in its entirety.

FIELD OF THE INVENTION

The present invention relates to a system for performing fluoroscopic imaging with high-energy X-ray generated by a high-energy electron accelerator in nondestructive inspection, fluoroscopic imaging, and a security inspection apparatus for large container inspection, vehicle inspection, air freight inspection, train inspection and the like, and in particularly, to a system for performing fluoroscopic imaging simultaneously on subjects in at least two channels by using a high-energy X-ray source.

BACKGROUND OF THE INVENTION

X-ray is widely applicable in the field of industrial nondestructive detection, security inspection and the like. For a large-sized subject to be detected, such as a boiler, a airspace engine, a bulk cargo at the airport/railway/custom, a car load freight in a car/truck/container/train or the like, the high-energy X-ray is required for the fluoroscopic inspection, which is usually generated by using an electron accelerator with energy above 2 MeV. A basic method for generating X-ray by the electron accelerator comprises: generating an electron beam using an electronic gun, accelerating the electron beam to obtain high energy using an electric field, and generating X-ray by using the high-energy electron beam to bombard a target. The high-energy X-ray fluoroscopic imaging system makes use of the high penetration capability of X-ray. When X-ray penetrates an object to be inspected (a subject), the intensity of X-ray weakens, and the extent of weakening is related to the density, the shape, the thickness, the material of the subject and etc. The intensity information of the X-ray after passing through the subject is acquired by using a detector, and then a fluoroscopic image reflecting the information of the subject such as the shape, the structure, even the material and the like is obtained through e.g. signal processing, algorithm analysis, image reconstruction and the like. Thus, the purposes, such as structure analysis, defect detection, cargo check, hazardous article recognition, contraband inspection and the like can be realized.

The inspection system for large-sized cargoes is divided into two types, one type using high-energy X-ray source, and the other type using isotope radioactive source. The system using high-energy X-ray source generally uses an electron accelerator having energy above 2 MeV to generate X-ray by bombarding a target. At present, NUCTECH Company Ltd. is one of the leaders in this technology application all over the world, and owns a large amount of patents and mature products. The system using isotope radioactive source generally uses γ-ray generated by the radioactive isotope Cobalt-60 (Co-60) as ray source, and the energy of γ-ray are 1.17 MeV and 1.33 MeV respectively. With respect to the inspection system for large-sized cargoes using Cobalt-60, on one hand, the energy of rays is low, the penetration energy is limited, and the volume of the subject that can be checked is limited; on the other hand, Cobalt-60 has a inherent half-time period of 5.27 years, and thus the ray source has to be replaced after a period of time, otherwise the image quality will degrade due to the weakening of ray intensity. The inspection system for large-sized cargoes using Cobalt-60 has many problems in safety management due to the inherent radioactivity of Cobalt-60, unlike the electron accelerator system, in which X-ray is generated only when power is on and the beam is produced, and which is safe when the beam is stopped or power is off. Therefore, more than 90% of the current large cargo inspection systems make use of high-energy X-ray source.

In prior art, all usages of high-energy X-ray are to obtain an X-ray beam in front of the electron beam which is bombarding the target to perform fluoroscopic imaging application, and make use of the portion of the X-ray having the highest energy and the largest intensity as far as possible. Generally only one X-ray beam is extracted for the system with only one inspection channel, and thus the inspection speed is slow and the efficiency is low.

The Chinese patent, "a dual-channel assembled mobile container or vehicle inspection system (Patent No.: CN2840027Y)", discloses a system in which the γ-ray generated by Cobalt-60 is used as ray source and two gate-type structural inspection channels on the left and right sides respectively are constituted by two L-shaped detectors, so that "the passing rate of detection is improved by 2-4 times" can be realized. The Cobalt-60 γ-ray source has its particularity in using and processing, such as a shutter device and the like, and has shortages such as low energy, limited penetration capability; short inherent decay, short life, which requires periodic replacement; long-term radiation, large difficulty in safety management, etc.

In view of the disadvantages in the prior art, the present invention provides a system in which an electron accelerator is used as ray source and at least two X-ray beams are respectively obtained by at least two collimators, to simultaneously perform fluoroscopic imaging on the subjects in at least two channels. In particular, the present invention also provides a system in which a high-energy electron accelerator is used as ray source and two X-ray beams are respectively obtained by collimators in two lateral positions, to simultaneously perform fluoroscopic imaging on the subjects in two channels. Compared with the prior art, the system has advantages such as low cost, high speed, multi functions, high image quality and high safety, etc.

SUMMARY OF THE INVENTION

The present invention provides a X-ray fluoroscopic imaging system for fluoroscopic imaging subjects in at least two inspection channels, comprising: an electron accelerator, a shielding and collimating device, at least two detector arrays, wherein, the electron accelerator includes an electron emitting unit, an electron accelerating unit and a target; wherein, the shielding and collimating device includes a shielding structure and at least two collimators respectively corresponding to the at least two detector arrays; wherein, each of the at least two detector arrays, the collimator corresponding to this detector array and a target point targeted by the electric beam are located in a plane.

Further, the present invention provides a dual-channel high-energy X-ray fluoroscopic imaging system, which comprises: a high-energy electron accelerator, a shielding and collimating device, a first inspection channel, a second inspection channel, a first detector array, a second detector array, a power supply and control subsystem, and a signal analysis and image processing subsystem; wherein, the high-energy electron accelerator includes an electron emitting unit, an electron accelerating unit and a target, and generates an electron beam with energy above 2 Mev;

wherein, the shielding and collimating device includes a shielding structure and at least two collimators, and two of the collimators are disposed on both sides of the axis of the electron beam respectively; wherein, the first inspection channel and the second inspection channel are disposed on both sides of the electron accelerator respectively; wherein, the first collimator, the first detector array and a target point targeted by the electric beam are located in a first plane, and the second collimator, the second detector array and the target point targeted by the electric beam are located in a second plane.

Further, the present invention provides a vehicle comprising the above-described X-ray fluoroscopic imaging system or the above-described dual-channel high-energy X-ray fluoroscopic imaging system.

Further, the present invention provides an assembled stationary dual-channel high-energy X-ray fluoroscopic imaging system, comprising the above-described dual-channel high-energy X-ray fluoroscopic imaging system, and further comprising: a device chamber, which is fixed on the ground between the first inspection channel and the second inspection channel, and in which the electron accelerator and the shielding and collimating device are mounted; at least one transferring device, which is mounted in the first inspection channel and/or the second inspection channel, and used to drag the subject to pass through the region radiated by the X-ray at a set speed; a first detector arm support, which is located outside the first inspection channel and in which a first detector array is mounted, such that the first detector array is located in the first plane in which the first collimator is located; a second detector arm support, which is located outside the second inspection channel and in which a second detector array is mounted, such that the second detector array is located in the second plane in which the second collimator is located; and a control chamber, in which the power supply and control subsystem and the signal analysis and image processing subsystem are mounted.

Further, the present invention provides a vehicular mobile dual-channel high-energy X-ray fluoroscopic imaging system, comprising the above-described dual-channel high-energy X-ray fluoroscopic imaging system, and further comprising a chassis on which at least an X-ray source cabin, a device cabin, an operating cabin, a first arm support system and a second arm support system are mounted; wherein: the electron accelerator and the shielding and collimating device are mounted in the X-ray source cabin, a first X-ray beam is extracted towards one side of the chassis by the first collimator, and a second X-ray beam is extracted towards the other side of the chassis by the second collimator; the first arm support system includes the first detector array; in its operating state, the first arm support system is unfolded on one side of the chassis and forms a 'gate-type' structure with the chassis, and the first detector array is located in the first plane in which the first collimator is located; and in its non-operating state, the first arm support system is folded and stored on the top of the chassis; the second arm support system includes the second detector array; in its operating state, the second arm support system is unfolded on the other side of the chassis and forms a 'gate-type' structure with the chassis, and the second detector array is located in the second plane in which the second collimator is located; and in its non-operating state, the second arm support system is folded and stored on the top of the chassis; the power supply and control subsystem, and the signal analysis and image processing subsystem are mounted in the device cabin; and in the operating cabin, a device for system operation and office is mounted.

Further, the present invention provides a vehicular mobile dual-channel dual-energy double-vision-angle high-energy X-ray fluoroscopic imaging system, comprising the above-described dual-channel high-energy X-ray fluoroscopic imaging system, and further comprising a chassis; on the chassis, at least an X-ray source cabin, a device cabin, an operating cabin, a first arm support system, a second arm support system, a third arm support system and a fourth arm support system are mounted; wherein: the electron accelerator and the shielding and collimating device are mounted in the X-ray source cabin, a first X-ray beam and a third X-ray beam having different energy and different angles are extracted towards one side of the chassis by the first collimator and the third collimator respectively, and a second X-ray beam and a fourth X-ray beam having different energy and different angles are extracted towards the other side of the chassis by the second collimator and the fourth collimator respectively; the first arm support system includes a first low-energy detector array; in its operating state, the first arm support system is unfolded on one side of the chassis and forms a 'gate-type' structure with the chassis, and the first low-energy detector array is located in the first plane in which the first collimator is located; in its non-operating state, the first arm support system is folded and placed on the top of the chassis; the third arm support system includes a first high-energy detector array; in its operating state, the third arm support system is unfolded on the one side of the chassis and forms a 'gate-type' structure with the chassis, and the first high-energy detector array is located in a third plane in which the third collimator is located; in its non-operating state, the third arm support system is folded and placed on the top of the chassis; the two "gate-type" structures formed by the first and third arm support systems with the chassis, one of the structures in front of the other, constitute the first inspection channel; the second arm support system includes a second low-energy detector array; in its operating state, the second arm support system is unfolded on the other side of the chassis and forms a 'gate-type' structure with the chassis, and the second low-energy detector array is located in the second plane in which the second collimator is located; in its non-operating state, the second arm support system is folded and placed on the top of the chassis; the fourth arm support system includes a second high-energy detector array; in its operating state, the fourth arm support system is unfolded on the other side of the chassis and forms a 'gate-type' structure with the chassis, and the second high-energy detector array is located in a fourth plane in which the fourth collimator is located; in its non-operating state, the fourth arm support system is folded and placed on the top of the chassis; the two "gate-type" structures formed by the second arm support system and the fourth arm support system with the chassis, one of the structures in front of the other, constitute the second inspection channel; the power supply and control subsystem, and the signal analysis and image processing subsystem are mounted in the device cabin; and in the operating cabin, a device for system operation and office is mounted.

The present invention simultaneously performs fluoroscopic imaging on the subjects in at least two inspection channels using only one electron accelerator, at least two sets of X-ray beams and at least two sets of detector systems, through the design of the electron accelerator, the shielding and collimating device, the at least two detector arrays and various mechanical composite structures, and has advantages as follows: the at least two channels are inspected simultaneously, and the speed is fast; only one electron accelerator is used, the structure is simple and the cost is low; instead of Cobalt-60, the electron accelerator is used as the ray source, and the security reliability is higher; more sets of X-ray beams may be extracted through the design of the collimators, and a dual-view-angle function may be realized to enable the hierarchical visibility of the fluoroscopic image; X-ray beams with different energy may be extracted, to realize the material recognition of the subjects; and a dual-channel/dual-energy/dual-view-angle high-energy X-ray fluoroscopic imaging system with integrated multifunction may be realized. Furthermore, the X-ray beam in the present invention has a number of advantages in the planar fan-shaped region thereof, such as small energy spread, uniform intensity distribution, small target point, and being able to be extracted at a large angle, etc. The image quality of the X-ray fluoroscopic imaging system can be improved. The X-ray fluoroscopic imaging system according to the present invention can be designed in specific forms of a stationary type, a assembled type, a track mobile type or vehicular mobile type, etc., and has advantages such as simple structure, low cost, strong function, good image quality and the like.

DETAILED DESCRIPTION OF THE EMBODIMENTS

Figure 1:
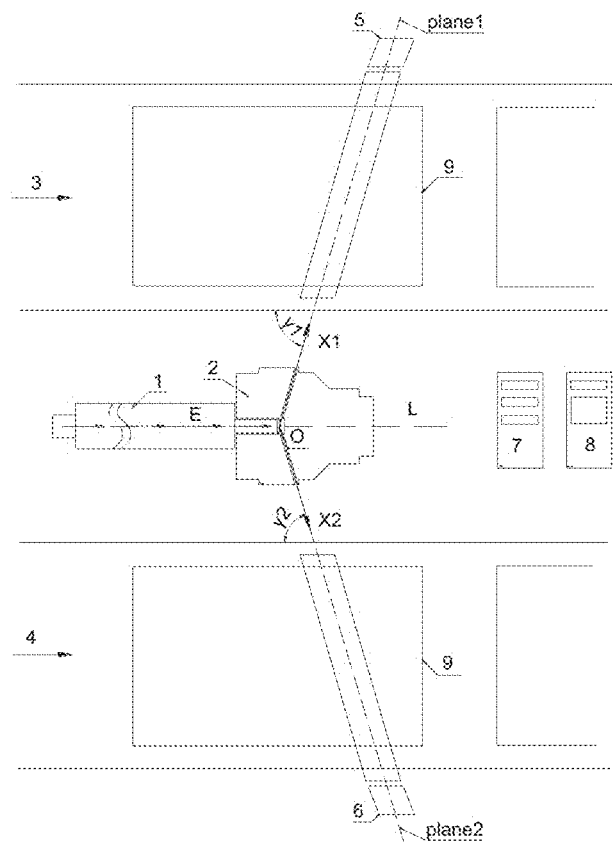
FIG. 1 is a structural schematic view illustrating a dual-channel high-energy X-ray fluoroscopic imaging system according to an embodiment of the present invention.
Figure 2:
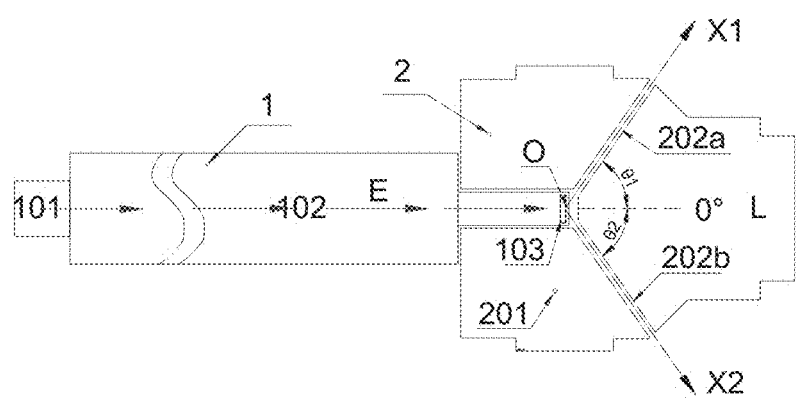
FIG. 2 is a structural schematic view illustrating an electron accelerator and a shielding and collimating device according to an embodiment of the present invention.
Figure 3:
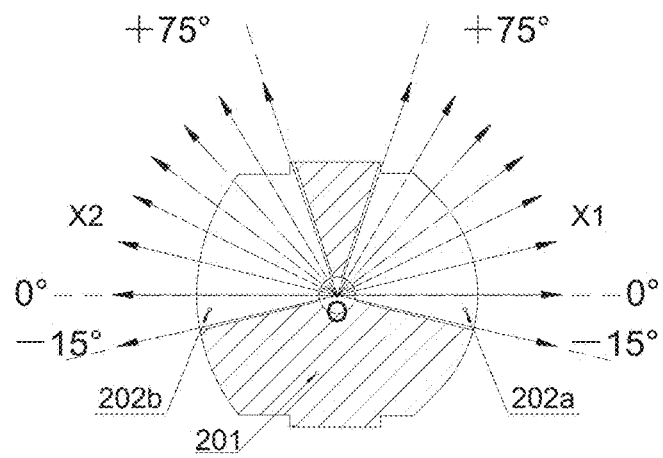
FIG. 3 is a structural schematic view illustrating a section of a shielding and collimating device according to an embodiment of the present invention.

As shown in FIG. 1, FIG. 2 and FIG. 3, a dual-channel high-energy X-ray fluoroscopic imaging system comprises: an electron accelerator 1, a shielding and collimating device 2, a first inspection channel 3, a second inspection channel 4, a first detector array 5, a second detector array 6, a power supply and control subsystem 7, and a signal analysis and image processing subsystem 8. The high-energy electron accelerator 1 includes an electron emitting unit 101, an electron accelerating unit 102 and a target 103, and generates an electron beam E with energy above 2 Mev. The shielding and collimating device 2 includes a shielding structure 201 and at least two collimators 202a and 202b, and the two collimators are respectively disposed on both sides of the axis of the electron beam E. The first inspection channel 3 and the second inspection channel 4 are respectively located on both sides of the electron accelerator 1. The first collimator 202a, the first detector array 5 and the target point targeted by the electric beam E are located in a first plane, and the second collimator 202b, the second detector array 6 and the target point targeted by the electric beam E are located in a second plane.

The first plane and the second plane respectively form a first angle and a second angle with respect to the axis of the electron beam E. Preferably, the first angle and/or the second angle have an angular range from 30° to 150°. A first X-ray beam and a second X-ray beam having uniform intensity distributions are extracted in the first plane and the second plane respectively.

Preferably, the first angle and the second angle are equal in magnitude, and the first X-ray beam and the second X-ray beam are plane symmetrical.

Figure 4:
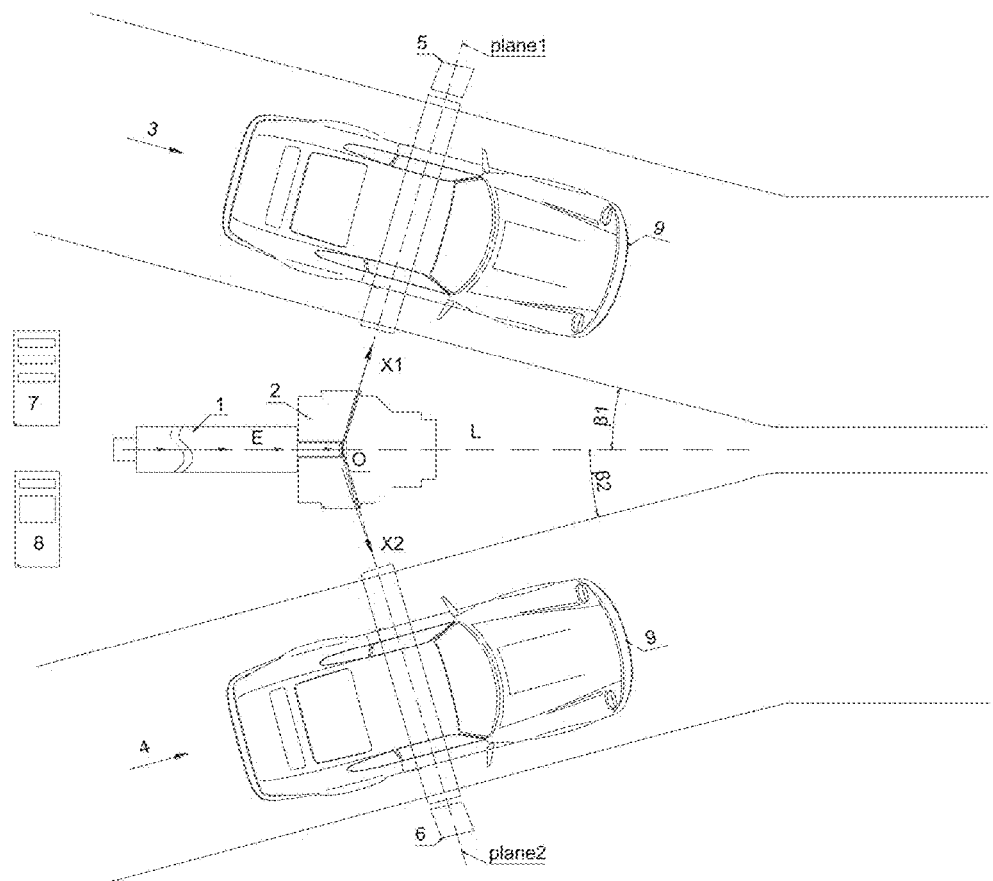
FIG. 4 is a schematic view illustrating a layout of a dual-channel high-energy X-ray fluoroscopic imaging system according to an embodiment of the present invention.

Preferably, the angle between the axis of the electron accelerator and the first inspection channel and the angle between the axis of the electron accelerator and the second inspection channel are both less than 60°, and more preferably, the axis of the electron accelerator is parallel to the first inspection channel and the second inspection channel. The case in which angles are formed between the axis L of the electron accelerator 1 and the inspection channels is illustrated in FIG. 4.

According to a preferred embodiment of the present invention, an angle formed between the first plane plane1 and the first channel 3 and an angle formed between the second plane plane2 and the second channel 4 are both larger than 45°. Preferably, the angle formed between the first plane plane1 and the first channel 3 and the angle formed between the second plane plane2 and the second channel 4 are both 90°. The case in which an angle γ1 is formed between the first plane plane1 and the first channel 3 and an angle γ2 is formed between the second plane plane2 and the second channel 4 is illustrated in FIG. 1.

FIG. 1 illustrates a schematic structure of a dual-channel high-energy X-ray fluoroscopic imaging system. The high-energy electron beam E which has an axis L is generated by the electron accelerator 1, and then bombards the target. X-ray radiated at a solid angle of 4π is generated at the target point O. Most of the X-ray is shielded and absorbed by the shielding and collimating device 2 surrounding the target point O. A planar fan-shaped first X-ray beam X1 and a planar fan-shaped second X-ray beam X2 are extracted respectively by the two collimators 202a and 202b located on the different sides of the axis L of the electron beam. The first inspection channel 3 and the second inspection channel 4 are respectively disposed on both sides of the electron accelerator 1, and the electron accelerator 1 is parallel to the first and second inspection channels. The target point O, the first collimator 202a, the first detector array 5 are located in the first plane plane1, and the angle γ1 is formed between the first plane plane1 and the first inspection channel 3. The target point O, the second collimator 202b, the second detector array 6 are located in the second plane plane2, and the angle γ2 is formed between the second plane plane2 and the second inspection channel 4. X1 and X2 simultaneously transmit through different positions of a plurality of subjects 9 in the first inspection channel 3 and the second inspection channel 4. The intensity of the X-ray is weakened to different extent, and respectively received by the first detector array 5 and the second detector array 6. After preliminarily processed by the first detector array 5 and the second detector array 6, the signals reflecting the intensity of X-ray are transmitted to the signal analysis and image processing subsystem 8. Fluoroscopic images reflecting two sections of the plurality of subjects 9 in the two channels which are penetrated by the X-ray are obtained after e.g. signal analysis, algorithm calculation and image construction, etc. In the operating process, if the subject 9 keeps moving relative to the X-ray fluoroscopic imaging system, that is, each portion of the subject passes through the X-ray fluoroscopic regions in the two inspection channels successively, two complete fluoroscopic images of the subjects 9 in the two inspection channels can be obtained, one is a first fluoroscopic image obtained with the first X-ray penetrating the subject in the first inspection channel and received by the first detector array 5, and the other one is a second fluoroscopic image obtained with the second X-ray penetrating the subject in the second inspection channel and received by the second detector array 6.

FIG. 2 illustrates a specific structure of the electron accelerator and the shielding and collimating device according to an embodiment of the present invention. The electron accelerator 1 comprises an electron emitting unit 101, an electron accelerating unit 102 and a target 103. The electron emitting unit generates an electron beam E, and the electron accelerating unit accelerates the electron beam E such that it becomes a high-energy electron beam. The axis L of the electron beam is also referred to as the axis of the electron accelerator 1. The target is bombarded by the high-energy electron beam, and the X-ray radiated at all angles to the space is generated at the target point O. The shielding and collimating device 2 surrounds the target, and is constituted by a shielding structure 201 and collimators 202; the collimators 202 include two collimators (202a and 202b, as illustrated in FIG. 2), which are respectively located on both sides of the axis L of the electron beam E. The collimator 202a deflects an angle $\theta 1$ from the electron beam, and guides out a planar fan-shaped first X-ray beam X1. The collimator 202a deflects an angle $\theta 2$ from the electron beam, and guides a planar fan-shaped second X-ray beam X2. $\theta 1$ and $\theta 2$ are deflections from the axis L of the electron beam in different directions, and are both defined as "positive" angle, for illustrative convenience. In the FIG. 2, $\theta 1$ and $\theta 2$ are equal in magnitude and symmetrical. Such an arrangement enables easy control of the intensity of each X-ray beam (for example, equaling the intensity of the X-ray beams), and makes it easy to arrange each inspection channel.

FIG. 3 illustrates a sectional view of the shielding and collimating device corresponding to the case in which $\theta 1=\theta 2=90°$ as shown in FIG. 2. The target point O is surrounded by the shielding and collimating device, most of the X-ray generated at the target point is shielded and absorbed by the shielding structure 201, and only a planar fan-shaped X-ray beam can be guided through a slit of the collimator 202. The dimension of the field angle, the opening positions and the thickness of the slit determine the shape distribution of the planar fan-shaped X-ray beam. Preferably, the X-ray beam has a thickness of 2 mm (that is, the thickness of the slit of the collimators 202a and 202b in FIG. 2) and a total field angle of 90° including a downward field angle of 15° (−15°) and a upward field angle of 75° (+75°) with respect to the horizontal plane (0°), and the first X-ray beam X1 and the second X-ray beam X2 is bilaterally symmetrical.

FIG. 4 illustrates a schematic layout of a dual-channel high-energy X-ray fluoroscopic imaging system. An angle $\beta 1$ is formed between the first inspection channel 3 and the axis L of the electric accelerator 1, and an angle $\beta 2$ is formed between the second inspection channel 4 and the axis L of the electric accelerator 1. As $\beta 1$ or $\beta 2$ is larger, the first inspection channel 3 and the second inspection channel 4 joins sooner, which does not facilitate to transport the subject and affects the inspection efficiency of the system. Therefore, in a preferred embodiment of the present invention, $\beta 1<60°$, $\beta 2<60°$, and preferably, $\beta 1=\beta 2=0$, that is, the first inspection channel, the second inspection channel and the electron accelerator are parallel to each other.

In FIG. 1, the angle $\gamma 1$ is formed between the first plane plane1 and the first channel, and the angle $\gamma 2$ is formed between the second plane plane2 and the second channel. As $\gamma 1$ or $\gamma 2$ is smaller, the paths of X-ray in the first plane plane1 or the second plane plane2 are longer, on one hand, the number of the detectors increases and thus the cost increases, on the other hand, the view angle is too oblique, and the hierarchical effect of image reconstruction is affected. Therefore in the present invention, $\gamma 1$ and $\gamma 2$ are both larger than 45°, and preferably, around 90°.

In a preferred embodiment of the present invention, the detector arrays (5, 6) are linear arrangements, piecewise linear arrangements, standard L-shaped arrangements, or C-shaped arrangements, consisting of a plurality of detectors.

In a preferred embodiment of the present invention, the detector arrays (5, 6) consist of a plurality of detectors arranged in one or more rows.

FIG. 5(A)-5(E) illustrate the different shapes and the different arrangements of several kinds of the detector arrays.

Figure 5:
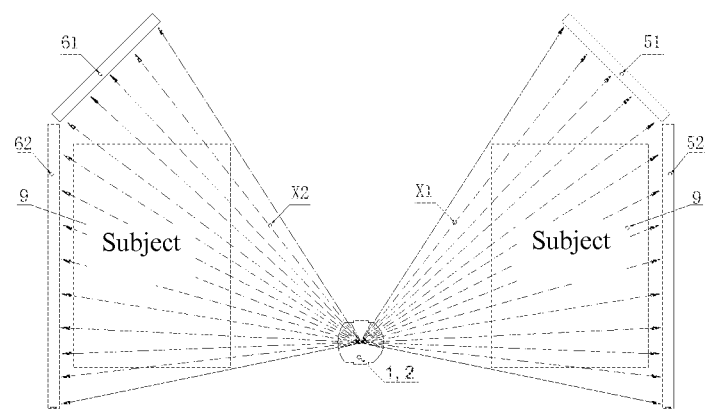
FIG. 5(A)-5(E) are schematic views illustrating structures and arranging methods of several detector arrays with different shapes, according to an embodiment of the present invention.
Figure 5:
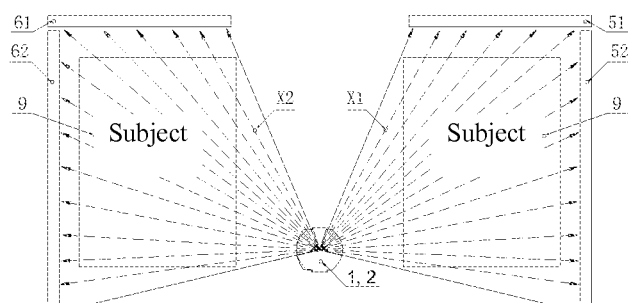
Figure 5:
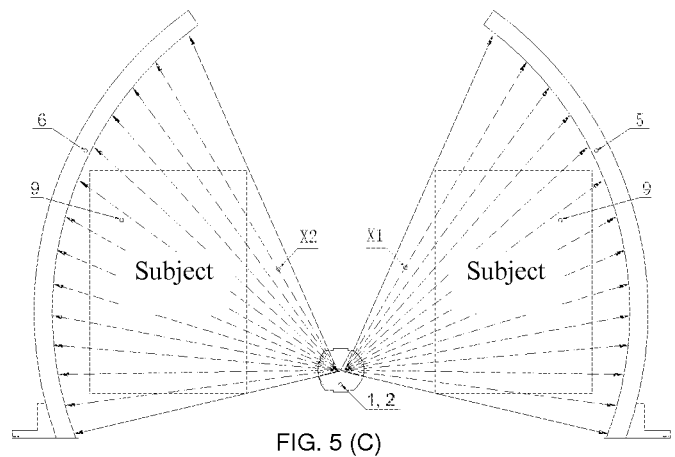
Figure 5:
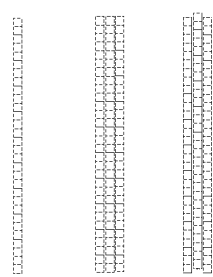
Figure 5:
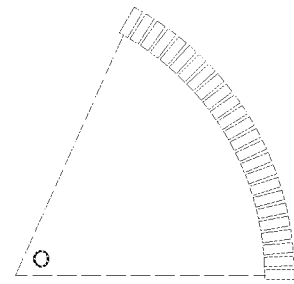

FIG. 5(A) illustrates a case in which the detector arrays are arranged in a piecewise linear form. The first detector array is divided into two linear segments, including a top segment 51 of the first detector array and a side segment 52 of the first detector array; similarly, the second detector array 6 is divided into a top segment 61 of the second detector array and a side segment 62 of the second detector array. The X-ray generated from the target point O is guided as a planar fan-shaped first X-ray beam X1 and a planar fan-shaped second X-ray beam X2 by the two collimators, and X1 and X2 penetrate the subjects and are received by the first detector array or the second detector array respectively. A fan-shaped region formed by the detector array and the target point may fully cover the section of the subject 9. The detector array with such a structure has a simple structure and is easy to mount and fix.

FIG. 5(B) illustrates a case in which the detector arrays are arranged in a standard L-shaped form. The first detector array 5 is divided into two perpendicular linear segments, with a "—" segment on the top being a top segment 51 of the first detector array and a "|" segment on the side being a side segment 52 of the first detector array; similarly, the second detector 6 is also divided into a "—" segment as a top segment 61 of the second detector array and a "|" segment as a side segment 62 of the second detector array. The X-ray generated from the target point O is guided by the two collimators as a planar fan-shaped first X-ray beam X1 and a planar fan-shaped second X-ray beam X2, and X1 and X2 penetrate the subjects and are received by the first detector array or the second detector array respectively. A fan-shaped region formed by the detector array and the target point may fully cover the section of the subject 9. The detector array with such a structure has a simple and regular structure and is easy to be formed as a foldable structure.

FIG. 5(C) illustrates a case in which the detector arrays are arranged in a C-shaped form. The first detector array 5 and the second detector array 6 is respectively located on two arcs, which may take the target point O as a center of circle. The X-ray generated from the target point O is guided by the two collimators as a planar fan-shaped first X-ray beam X1 and a planar fan-shaped second X-ray beam X2, and X1 and X2 penetrate the subjects and are received by the first detector array or the second detector array respectively. A fan-shaped region formed by the detector array and the target point O may fully cover the section of the subject 9. In the detector array with such a structure, the distance from each detector to the target point is identical, and the X-ray beams guided by the collimators just have a uniform intensity distribution in all angles, and thus the intensity of the initial X-ray signal received by each detector is identical. Therefore, the detectors with a same amplification factor may be selected to form the first and second detector arrays, which facilitates to simplify the system and decrease the costs.

FIG. 5(D) illustrates a case in which the arrangements of the detector arrays are observed in the direction of the X-ray. The detector arrays may comprise a plurality of detectors arranged in one or more rows. When the detectors are arranged in more than one row, the detectors may be juxtaposed or staggered. If more than one row of detectors are used, the cost for detectors increases, however, the sectional thickness (or referred to as the number of slices) of the subject obtained each time also increases several times, and the inspection speed of the system may improve several times.

FIG. 5(E) illustrates that the end surface of the detector in each position is perpendicular to the X-ray. In the X-ray fluoroscopic imaging system, all detectors generally receive the X-ray on their front surfaces, that is, all detectors are arranged such that their end surfaces faces the target point O.

According to an embodiment of the present invention, the dual-channel high-energy X-ray fluoroscopic imaging system further includes a first detector arm support 10a and a second detector arm support 10b, which are used to mount and fix the detectors and form linear arrangements, piecewise linear arrangements, standard L-shaped arrangements, or C-shaped arrangements as described above. The detector arm supports may be tubular, and may protect the detectors mounted therein. The detector arm supports have openings in positions corresponding to the end surfaces of the detectors, so as not to obstruct the direct arrival of the X-ray to the end surfaces of the detectors.

According to an embodiment of the present invention, the dual-channel high-energy X-ray fluoroscopic imaging system further comprises a device chamber 13, in which the devices such as the electron accelerator and the like are mounted and fixed, and which provides an appropriate temperature and humidity operating environment so as to comply with the provisions of the state on operation and management of X-ray equipments. The device chamber may be various cabins, for example, a device cabin converted from a container, and also may be a temporary house or stationary building.

According to an embodiment of the present invention, the dual-channel high-energy X-ray fluoroscopic imaging system further comprises a control chamber 14, for providing an appropriate place for the operations of devices for an operator of the system. The control chamber may be various cabins, such as a device cabin converted from a container, and also may be a temporary house or stationary building.

According to an embodiment of the present invention, the dual-channel high-energy X-ray fluoroscopic imaging system further comprises a connecting and fixing device 11, used to connect and fix the first detector arm support 10a and the second detector arm support 10b. Alternatively, the first detector arm support 10a and the second detector arm support 10b are fixedly connected to the device chamber 13, such that the first detector array 5 is located in the first plane plane1 and the second detector array 6 is located in the second plane plane2. The whole cross section of the dual-channel high-energy X-ray fluoroscopic imaging system shows a structure with a "Π" shape, a "M" shape, or a "Ω" shape.

According to an embodiment of the present invention, the dual-channel high-energy X-ray fluoroscopic imaging system further comprises a first adjustable fixing device 15a and a second adjustable fixing device 15b, for respectively fixing the first detector arm support 10a and the second detector arm support 10b on the ground, and for flexibly adjusting the location of the detector arm supports and the direction of the openings, such that the first detector array 5 is located in the first plane plane1 and the second detector array 6 is located in the second plane plane2. The whole of the dual-channel high-energy X-ray fluoroscopic imaging system shows a III-shaped structure.

According to an embodiment of the present invention, the dual-channel high-energy X-ray fluoroscopic imaging system further comprises a first transferring device 16a and a second transferring device 16b, which are located in the first inspection channel and the second inspection channel respectively, and used to drag the subjects 9 to pass through the first plane and the second plane radiated by the X-ray at a set speed. The transferring devices may be one or two of various transferring types, such as belt, roller way, chains, wheel, tow bar and the like.

According to an embodiment of the present invention, the dual-channel high-energy X-ray fluoroscopic imaging system further comprises a first anti-scattering shield 12a and a second anti-scattering shield 12b disposed on one side or both sides of the inspection channels, for shielding the reflected rays and the scattered rays formed when the X-ray penetrates the subject, so as to ensure the safety of the operator and the public. The anti-scattering shields beside the collimators have stripe-shaped openings in the positions corresponding to the collimators which enable the passing of the X-ray; the anti-scattering shield beside the detectors is behind the detector arm support.

According to an embodiment of the present invention, the dual-channel high-energy X-ray fluoroscopic imaging system further comprises a sloping stage for raising up the subject, such that any portion of the section of the subject is within the coverage of the first X-ray beam or the second X-ray beam.

Of particular note is that the type, number, arrangement type, arrangement structure of the two detector arrays of the dual-channel high-energy X-ray fluoroscopic imaging system may be the same or different, according to an embodiment of the present invention.

Of particular note is that in the shielding and collimating device of the dual-channel high-energy X-ray fluoroscopic imaging system, more collimators may be disposed facing each inspection channel, to provide more X-ray beams, so that a multi-view-angle or multi-energy X-ray fluoroscopic imaging system may be formed in each inspection channel, according to an embodiment of the present invention.

Of particular note is that regarding the dual-channel high-energy X-ray fluoroscopic imaging system, each portion of the system may be arranged on the ground, to form a stationary system; alternatively, part of the system may be fixed on the ground and another part may be arranged on a short-distance mobile apparatus, to form a partially mobile system; still alternatively, the system may be entirely arranged on a chassis that may move for a long distance, to form a vehicular mobile system, according to an embodiment of the present invention.

Figure 6:
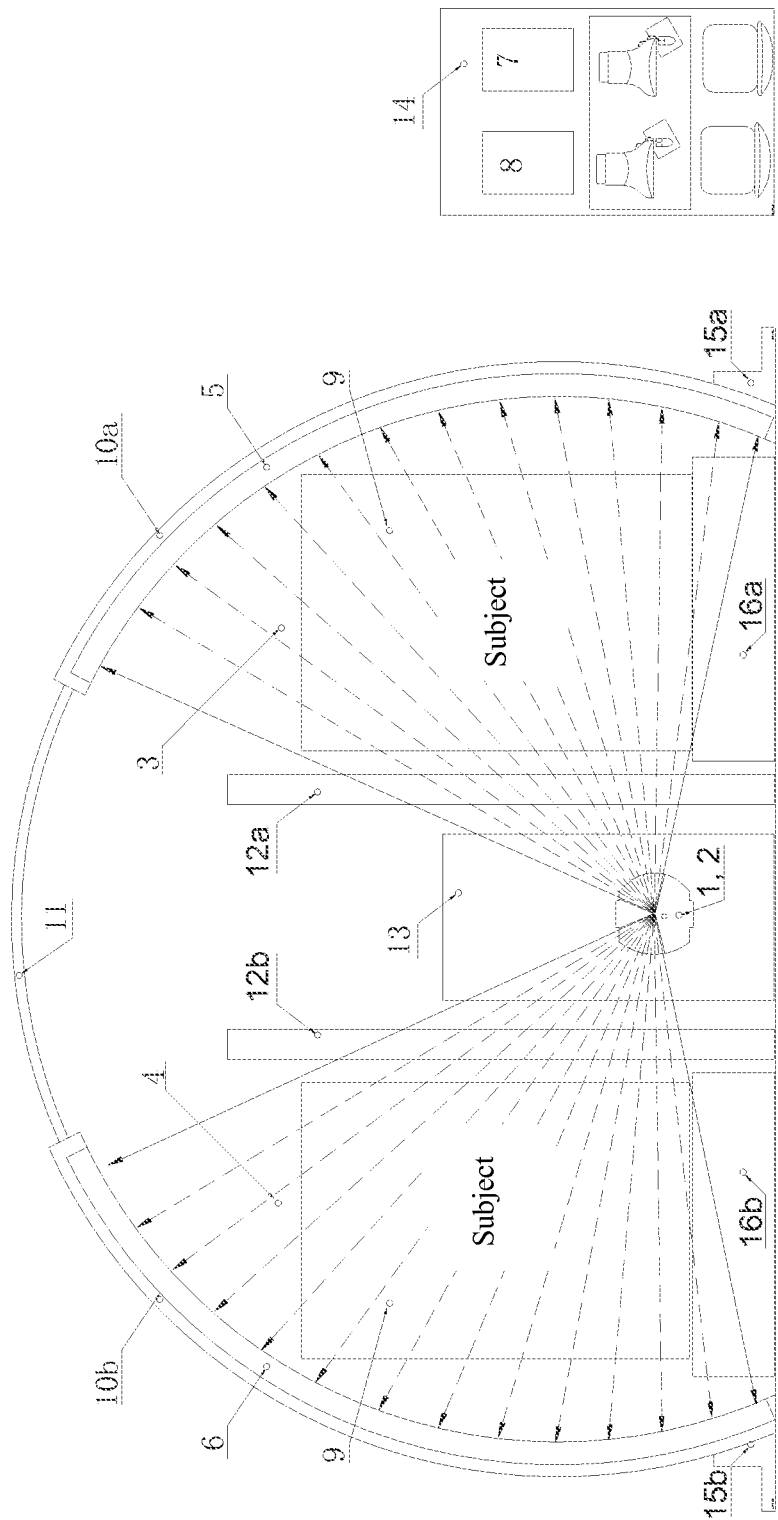
FIG. 6 is a structural schematic view illustrating a assembled stationary dual-channel high-energy X-ray fluoroscopic imaging system according to an embodiment of the present invention.

FIG. 6 illustrates an example of an assembled stationary dual-channel high-energy X-ray fluoroscopic imaging system.

The assembled stationary dual-channel high-energy X-ray fluoroscopic imaging system comprises an electron accelerator 1, a shielding and collimating device 2, a first inspection channel 3, a second inspection channel 4, a first detector array 5, a second detector array 6, a power supply and control subsystem 7, a signal analysis and image processing subsystem 8, a first detector arm support 10a, a second detector arm support 10b, a connecting and fixing device 11, a first anti-scattering shield 12a, a second anti-scattering shield 12b, a device chamber 13, a control chamber 14, a first adjustable fixing device 15a, a second adjustable fixing device 15b, a first transferring device 16a and a second transferring device 16b.

The electron accelerator 1, the shielding and collimating device 2 and the like are mounted in the device chamber 13 and located between the first inspection channel 3 and the second inspection channel 4 which are disposed in parallel, and the axis of the electron accelerator is also parallel to the inspection channels. A first plane plane1 in which the collimator 202a is located is perpendicular to the first inspection channel 3, and a second plane plane2 in which the collimator 202b is located is perpendicular to the second inspection channel 4. The fan-shaped slit of the collimators 202a and 202b respectively have total field angles of 90°, including −15° downward and +75° upward. A C-shaped detector arm support 10a is located outside the first inspection channel 3, and the first detector array 5 is mounted inside the C-shaped detector arm support 10a. A C-shaped detector arm support 10b is located outside the second inspection channel 4, and the second detector array 6 is mounted inside the C-shaped detector arm support 10b. The top of the two C-shaped detector arm supports 10a and 10b are connected by the connecting and fixing device 11 crossing the device chamber 13, and the bottom thereof are fixed on the ground by the first adjustable mounting and fixing device 15a and the second adjustable mounting and fixing device 15b, respectively, in positions respectively corresponding to the collimator 202a and 202b. That is to say, the target point O, the collimator 202a and the first detector array 5 are located in the first plane plane1, and the target point O, the collimator 202b and the second detector array 6 are located in the second plane plane2. The detector arm support 10, the connecting and fixing device 11 and the adjustable mounting and fixing device 15 form a large "Ω" shape. The first transferring device 16a and the second transferring device 16b are respectively mounted in the first inspection channel 3 and the second inspection channel 4, and may carry a large box, such as an air container, an air tray and the like, to pass through the inspection region of the X-ray. One portion of the first anti-scattering shield 12a is disposed between the device chamber 13 and the first inspection channel 3, and another portion thereof is disposed behind the first detector arm support 10a. One portion of the second anti-scattering shield 12b is disposed between the device chamber 13 and the second inspection channel 4, and another portion thereof is disposed behind the second detector arm support 10b. The anti-scattering shields 12a and 12b have a composite structure of lead sheet and steel sheet, wherein the lead sheet is used to shield the X-ray and the steel sheet is used to support and fix the structures. The anti-scattering shields have stripe-shaped openings in the positions corresponding to the collimators 202a and 202b, so as not to shield the first X-ray beam X1 and the second X-ray beam X2. The power supply and control subsystem 7, the signal analysis and image processing subsystem 8, office facilities and the like are arranged in the control chamber 14. The device chamber 13 and the control chamber 14 are steel-structure cabins with a thermal insulation layer, have basic facilities such as window, door, air conditioner, illumination, ventilation and the like, have hoisting structures on the top and fixing structures on the bottom, and may be placed and installed flexibly. The device chamber, the control chamber, the transferring devices, and the detector arm supports are interconnected via cables, and each of these structures is relatively independent and may be fixed and mounted flexibly on the spot, therefore, the system is referred to as an assembled stationary type. Such an assembled stationary dual-channel high-energy X-ray fluoroscopic imaging system is applicable to perform fluoroscopic imaging inspection on a large-sized or medium-sized container, a box shipping luggage and other subjects in the places such as a airport or a freight station.

Figure 7:
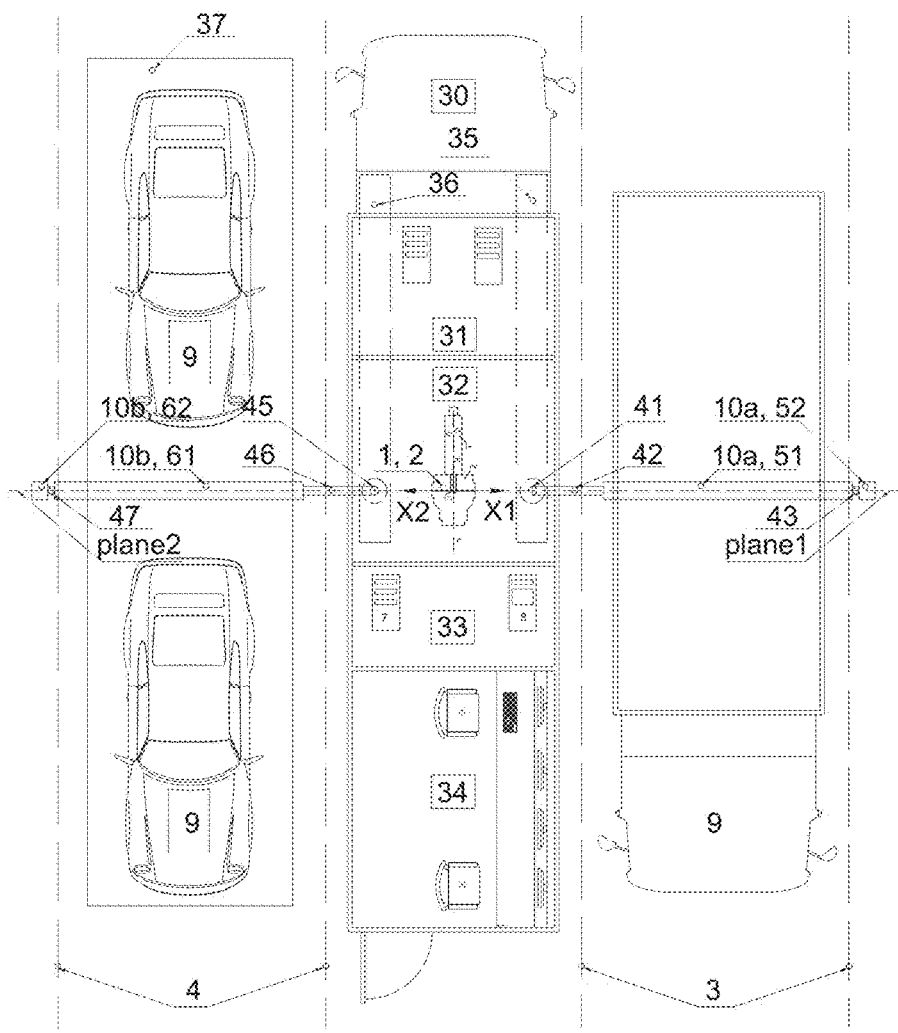
FIG. 7 is a structural schematic view of a vehicular mobile dual-channel high-energy X-ray fluoroscopic imaging system according to an embodiment of the present invention.

FIG. 7 illustrates an example of a vehicular mobile dual-channel high-energy X-ray fluoroscopic imaging system.

A vehicular mobile dual-channel high-energy X-ray fluoroscopic imaging system comprises an electron accelerator 1, a shielding and collimating device 2, a first inspection channel 3, a second inspection channel 4, a first detector array 5, a second detector array 6, a power supply and control subsystem 7, a signal analysis and image processing subsystem 8, a chassis 30, a power supply cabin 31, a X-ray source cabin 32, an device cabin 33, a operating cabin 34, and further comprises a first arm support system constituted by a foldable L-shaped first detector arm support 10a, a first lifting and rotating device 41, a first connecting and supporting device 42, a first folding and connecting device 43, and a second arm support system constituted by a foldable L-shaped second detector arm support 10b, a second lifting and rotating device 45, a second connecting and supporting device 46, a second folding and connecting device 47.

The chassis 30 is a large truck, for example, a three-axle heavy-duty chassis of Volvo, on which a plurality of cabins are disposed. The cabins include the power supply cabin 31, the X-ray source cabin 32, the device cabin 33, the operating cabin 34, etc. Each cabin is designed to have facilities such as thermal insulation layer, window, door, air conditioner, illumination, ventilation and the like as needed.

A power supply apparatus is mounted in the power supply cabin 31. The power supply apparatus may be a power generation apparatus such as a diesel generator, and/or an electric supply connection device such as a device including a cable and an auto drum which connects with the electric supply. The power supply cabin supplies power for the entire system, and has a power capacity generally above 15 kVA.

The electron accelerator 1, the shielding and collimating device 2 and etc. are mounted in the X-ray source cabin 32. The axis L of the electron accelerator is parallel to the bilateral symmetrical line of the chassis, and the electron accelerator is on the symmetrical line. The two collimators 202a and 202b of the shielding and collimating device are located on both sides of the axis of the electron accelerator respectively, and are perpendicular to the axis. The extracted first X-ray beam X1 and the second X-ray beam X2 radiate from both sides of the chassis, through the stripe-shaped openings on both sides of the X-ray source cabin 32. The vehicular mobile dual-channel high-energy X-ray fluoroscopic imaging system may further comprise a radiological-safety protection subsystem, constituted by a assist shielding facility, a radiation marking, a acousto-optic warning, an environmental dose monitor, a camera monitor, a safety interlock and the like which comply with the relevant provisions of the state. All or part of the devices of radiological-safety protection subsystem may also be mounted in the ray source cabin.

The power supply and control subsystem 7, the signal analysis and image processing subsystem 8 and other relevant devices are mounted in the device chamber 33. The power supply and control subsystem 7 further comprises a branch subsystem for movement control of the first arm support system and the second arm support system.

The operating cabin 34 is mounted in the tail of the chassis. Office desks and chairs, displaying devices, operating control devices and the like may be mounted inside the operating cabin 34. The operating cabin 34 is a place for the operator to operate the vehicular mobile dual-channel high-energy X-ray fluoroscopic imaging system.

The first lifting and rotating device 41 and the second lifting and rotating device 45 are mounted in places corresponding to the collimators 202a and 202b on each side in the upper portion of the X-ray source cabin 32, respectively. The foldable L-shaped first detector arm support 10a is connected to the first lifting and rotating device 41 by the first connecting and supporting device 42. The foldable L-shaped first detector arm support 10a is divided into two linear segments, namely a "—" segment and a "|" segment. A first detector top array 51 is mounted in the "—" segment, and a first detector side array 52 is mounted in the "|" segment. The two segments are connected by a first folding and connecting device 43, to form the first arm support system. The first lifting and rotating device 41 is used to lift and rotate in a certain angle the first arm support system with respect to the chassis, by various implementation methods, such as using a hydraulic device, a pneumatic device, a motor or the like. The first folding and connecting device 43 is used to connect the two linear segments of the L-shaped detector arm support, namely the "—" segment and the "|" segment, and fold the two segments as a "=" shape or unfold them as a "L" shape, also by various implementation methods, such as using a hydraulic linkage device, a pneumatic device, a combination of a motor and gears or the like. In a non-operating state, the first arm support system is placed in a position illustrated with the dotted box 35 on the top of the chassis by folding and furling; in a operating state, it is unfolded on the right side of the chassis, such that the first detector top array 51 and the side array 52 is located within the first plane plane1 in which the first X-ray beam X1 is located. The unfolded first arm support system together with the chassis forms a "gate-type" structure, within which is the first inspection channel 3.

The foldable L-shaped second detector arm support 10b is connected to the second lifting and rotating device 45 by the second connecting and supporting device 46. The foldable L-shaped second detector arm support 10b is divided into two linear segments, namely a "—" segment and a "|" segment. A second detector top array 61 is mounted in the "—" segment, and a second detector side array 62 is mounted in the "|" segment. The two segments are connected by a second folding and connecting device 47, to form the second arm support system. The second lifting and rotating device 45 is used to lift and rotate in a certain angle the second arm support system with respect to the chassis, by various implementation methods, such as using a hydraulic device, a pneumatic device, a motor or the like. The second folding and connecting device 47 is used to connect the two linear segments of the L-shaped detector arm support, namely the "—" segment and the "|" segment, and fold the two segments as a "=" shape or unfold them as a "L" shape, also by various implementation methods, such as using a hydraulic linkage device, a pneumatic device, a combination of a motor and gears or the like. In a non-operating state, the second arm support system is placed in a position illustrated with the dotted box 36 on the top of the chassis by folding and furling; in a operating state, it is unfolded on the left side of the chassis, such that the second detector top array 61 and the side array 62 is located within the second plane plane2 in which the second X-ray beam X2 is located. The unfolded second arm support system together with the chassis forms a "gate-type" structure, within which is the second inspection channel 4.

All facilities of the vehicular mobile dual-channel high-energy X-ray fluoroscopic imaging system are integrated on a chassis, to form a special equipped vehicle. Normally, the detector arm support systems are folded and furled in the region 35 and the region 36 (shown as the dotted boxes in FIG. 7). The vehicular mobile dual-channel high-energy X-ray fluoroscopic imaging system may be driven on various roads such as a county-level road or above, by means of the chassis, and thereby may meet the application requirement in various occasions flexibly.

The operating principles and processes are as follows:

The vehicular mobile dual-channel high-energy X-ray fluoroscopic imaging system is driven to a certain application requirement place. The detailed operating processes are as follows:

(1) The vehicular mobile dual-channel high-energy X-ray fluoroscopic imaging system parks in a flat and open workplace and the operator enter the operating cabin and start the system;

(2) The power supply apparatus in the power supply cabin 31 starts to work, for example, the generator starts, or the electric cable is connected to the electric supply apparatus, and power is supplied to the vehicular mobile dual-channel high-energy X-ray fluoroscopic imaging system;

(3) The branch subsystem for movement control of the detector arm support systems in the power supply and control subsystem 7 works, such that:

(a) for the first arm support system, firstly the first lifting and rotating device 41 rises to a certain height, and then rotates clockwise a certain angle, for example, 90°, such that the first detector top array 41 and the first detector side array 42 are located in the first plane plane1 in which the target point O and the collimator 202a are located; The first folding and connecting device 43 drives the foldable L-shaped first detector arm support 10a to be unfolded from a folded "=" state to a "L" state;

(b) for the second arm support system, firstly the second lifting and rotating device 45 rises to a certain height, and then rotates counterclockwise a certain angle, for example, 90 degrees, such that the second detector top array 61, the second detector side array 62 are located in the second plane plane2 in which the target point O and the collimator 202b are located; The second folding and connecting device 47 drives the foldable L-shaped second detector arm support 10b to be unfolded from a folded "=" state to a "L" state;

(a) and (b) may be performed either successively or concurrently. The two detector arm support systems on each side of the chassis and the chassis constitute a "M" structure;

(4) The subjects, such as container trucks, vans, coaches, cars and the like, respectively park in two queues in the first inspection channel 3 or the second inspection channel 4, and the drivers leave the subjects;

(5) The power supply and control subsystem 7 starts the electron accelerator 1, the first X-ray beam X1 is output in the first plane through the collimator 202a, and at the same time, the second X-ray beam X2 is output in the second plane through the collimator 202b; X1 directly reaches or reaches after penetrating the subjects the detector array 51 in the "—" segment of the first detector arm support 10a and the detector array 52 in the "|" segment of the first detector arm support; X2 directly reaches or reaches after penetrating the subjects the detector array 61 in the "—" segment of the second detector arm support 10b and the detector array 62 in the "|" segment of the second detector arm support; all detector arrays convert the received signals and transmit the converted signals to the signal analysis and image processing subsystem 8;

(6) While the power supply and control subsystem 7 is starting the electron accelerator, the chassis starts to drive automatically, and moves along a straight line at a set speed, to make the X-ray beams X1 and X2 successively scan all subjects in the inspection channels;

(7) A first inspection channel X-ray fluoroscopic data and a second inspection channel X-ray fluoroscopic data reflecting the information on the geometric structure and material of the subjects are obtained by the signal analysis and image processing subsystem 8 synchronously (synchronous to the step (5) and (6) described above), and fluoroscopic images of the subjects are generated after signal analysis, algorithm calculation, image construction and etc., and displayed on a displaying apparatus in real time; the operator achieve inspection purposes such as contraband inspection, hazardous articles inspection, prohibited articles inspection and the like, based on the image information;

(8) The subject such as a container truck, a coach, a car or the like leaves the inspection channel, if the inspection is complete and no problems need to be settled;

(9) If there are a number of batches of subjects, (4)-(8) are repeated; if the inspection task is complete, the electron accelerator is stopped and no X-ray is generated, and:

(a) for the first arm support system, firstly the first folding and connecting device 43 drives the foldable L-shaped first detector arm support 10a to be furled from the "L" unfolded state to the "=" folded state; the first lifting and rotating device 41 rotates counterclockwise a certain angle such as 90°, such that the folded L-shaped first detector arm support 10a reaches above the region illustrated with the dotted box 35, and falls a certain height to arrive at the place for storage;

(b) for the second arm support system, firstly the second folding and connecting device 47 drives the foldable L-shaped second detector arm support 10b to be furled from the "L" unfolded state to the "=" folded state; the second lifting and rotating device 45 rotates clockwise a certain angle such as 90°, such that the folded L-shaped second detector arm support 10b reaches above the region illustrated with the dotted box 36, and falls a certain height to arrive at the place for storage;

(a) and (b) may be performed either successively or concurrently;

(10) The operator stops the system, turns off the power, and leaves the operating chamber, and the vehicular mobile dual-channel high-energy X-ray fluoroscopic imaging system may be driven to the next workplace.

The vehicular mobile dual-channel high-energy X-ray fluoroscopic imaging system may further comprise a sloping stage 37, for raising up the subject, and achieving complete imaging for the subject. For example, when a car is inspected, the tires of the car may also be imaged, in order to examine whether the prohibited articles such as drugs are smuggled in the tires of the car. The sloping stage 37 has a known design structure, for example a steel-frame structure or a stationary sloping stage. When the system is performing imaging, part of structure information of the sloping stage 37 may be eliminated, so as to reduce or eliminate the influence of the sloping stage on the image of the subject. If the sloping stage 37 is a steel-frame structure, in a non-operating state, it may be hung beneath the chassis as pieces or segments and moved with the chassis.

The vehicular mobile dual-channel high-energy X-ray fluoroscopic imaging system may be arranged in a custom, a land port, an airport, an important place and etc., to perform fluoroscopic imaging on a container vehicle, large-sized/medium-sized/small-sized trucks, various cars, and a small-sized coach, etc. and obtain clear fluoroscopic images, so as to quickly and efficiently inspect the subject that may contain contrabands, hazardous articles or prohibited articles.

Figure 8:
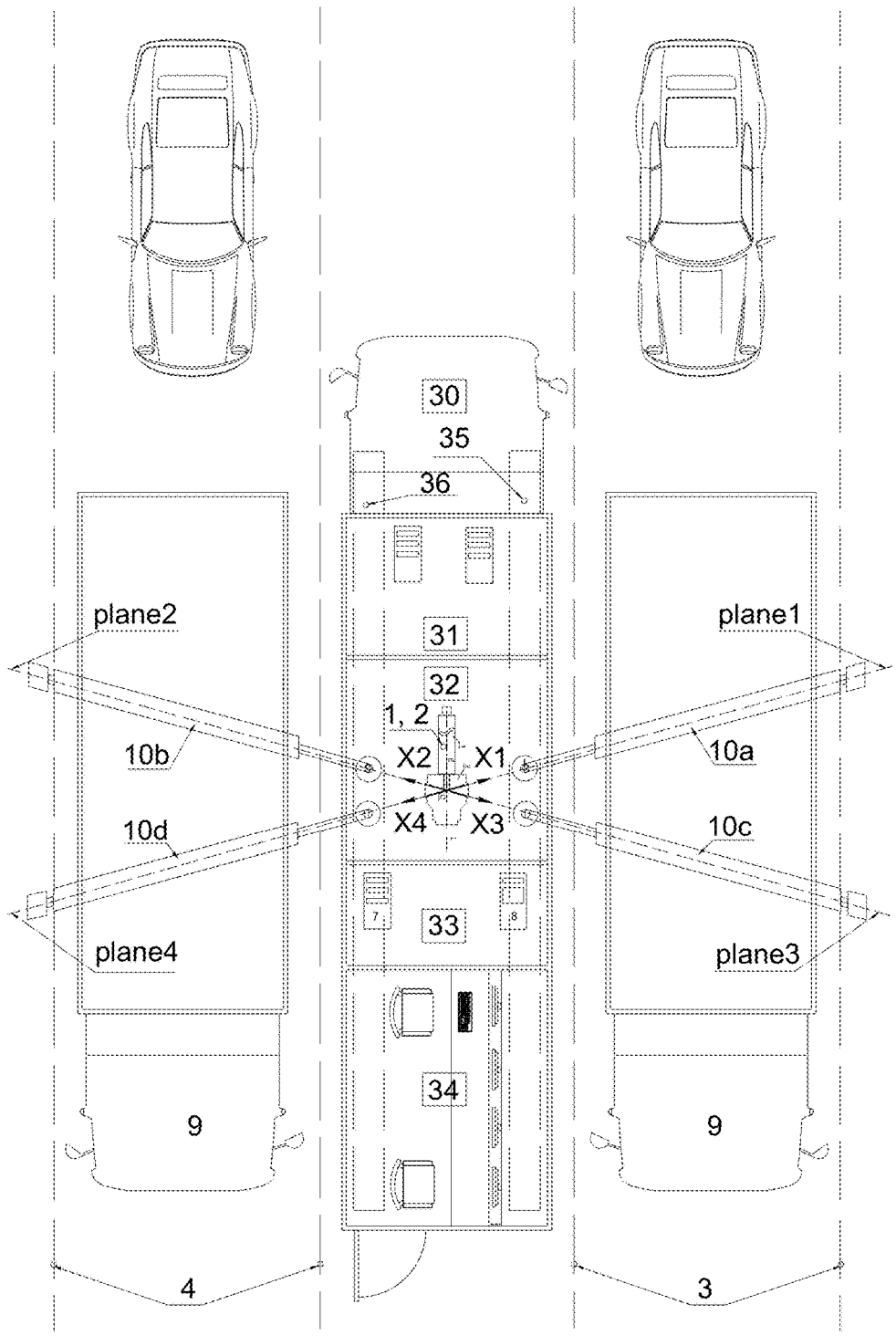
FIG. 8 is a structural schematic view of a vehicular mobile dual-channel/dual-energy/dual-view-angle high-energy X-ray fluoroscopic imaging system according to an embodiment of the present invention.

FIG. 8 illustrates an example of a vehicular mobile dual-channel/dual-energy/dual-view-angle high-energy X-ray fluoroscopic imaging system.

Comparing with the vehicular mobile dual-channel high-energy X-ray fluoroscopic imaging system illustrated in FIG. 7, the vehicular mobile dual-channel/dual-energy/dual-view-angle high-energy X-ray fluoroscopic imaging system has similar elementary structures such as the chassis, and mainly differs in that: the shielding and collimating device 202 has four collimators 202a, 202b, 202c and 202d, which are distributed on both sides of the axis of the electron beam E and generate a first X-ray beam X1, a second X-ray beam X2, a third X-ray beam X2 and a fourth X-ray beam X4 respectively. X1 and X3 are guided out from the right side of the chassis, and have different energy. X1 is a low-energy X-ray beam, and X3 is a high-energy X-ray beam. Further, the first plane plane1 in which X1 is located and the third plane plane3 in which X3 is located have different view angles with respect to the inspection channel 3. X2 and X4 are guided out from the left side of the chassis, and have different energy. X2 is a low-energy X-ray beam, and X4 is a high-energy X-ray beam. Further, the second plane plane2 in which X2 is located and the fourth plane plane4 in which X4 is located have different view angles with respect to the inspection channel 4. Correspondingly, there are also four sets of detector arm supports, and each set has substantially same composition, structure and operating principle with those of the normal vehicular mobile dual-channel high-energy X-ray fluoroscopic imaging system illustrated in FIG. 7. In a operating state, the first set of the detector arm supports 10a causes the internally mounted first low-energy detector array to locate in the first plane plane1, and the third set of the detector arm supports 10c causes the internally mounted first high-energy detector array to locate in the third plane plane3, so as to form the first inspection channel 3; the second set of the detector arm supports 10b causes the internally mounted second low-energy detector array to locate in the second plane plane2, and the fourth set of the detector arm supports 10d causes the internally mounted second high-energy detector array to locate in the fourth plane plane4, so as to form the second inspection channel 4.

The vehicular mobile dual-channel/dual-energy/dual-view-angle high-energy X-ray fluoroscopic imaging system has substantially similar operating process with the normal vehicular mobile dual-channel high-energy X-ray fluoroscopic imaging system illustrated in FIG. 7, except that there is an additional step in the image processing, that is, a further algorithm analysis and processing is performed on the four fluoroscopic images acquired by the four sets of the detector systems by the signal analysis and image processing subsystem 8, and two fluoroscopic images reflecting the information on the hierarchical structure and material of the subjects in the first inspection channel 3 and the second inspection channel 4 are formed.

The patent CN101210895 has made a detailed description of a method for performing fluoroscopic imaging on the subject by using two X-ray beams having different view angles and finally constructing a multilayered image. In one embodiment, a dual-view-angle fluoroscopic image of the first inspection channel 3 is obtained by applying a dual-view-angle image reconstruction algorithm to the images acquired in the two planes plane1 and plane3, and a dual-view-angle fluoroscopic image of the second inspection channel 4 is obtained by applying a dual-view-angle image reconstruction algorithm to the images acquired in the two planes plane2 and plane4.

Patents such as CN101435783 have made a detailed description of a method for successively performing fluoroscopic imaging on the subject by using two X-ray beams having different energy and finally constructing a fluoroscopic image reflecting the material information. In one embodiment, a dual-energy fluoroscopic image of the first inspection channel 3 is obtained by applying a dual-energy material recognition algorithm to the images achieved in the two planes plane1 and plane3, and a dual-energy fluoroscopic image of the second inspection channel 4 is obtained by applying a dual-energy material recognition algorithm to the images achieved in the two planes plane2 and plane4.

Since the X-ray beams generated in different azimuth angles with respect to the target have different distributions of energy and intensities when the electron beam bombards the target, a subsystem formed by the electron accelerator and a plurality of shielding and collimating devices may guide out a plurality of X-ray beams having different angles, different intensities, different energy distributions, when the plurality of shielding and collimating devices are arranged in different angles with respect to the target, and the plurality of X-ray beams have features such as a uniform intensity distribution, a relatively small energy spread and a relatively small focus of the X-ray in respective planar fan-shaped regions, in addition to the different intensity, the different energy and the different angles.

In conclusion, the vehicular mobile dual-channel/dual-energy/dual-view-angle high-energy X-ray fluoroscopic imaging system illustrated in FIG. 8 may perform fluoroscopic imaging with structure layering information and material information on the subjects in two inspection channels simultaneously. The system may be arranged in a custom, a land port, an airport, an important place or the like, to perform fluoroscopic imaging on various container vehicles, large-sized/medium-sized/small-sized trucks, various cars, small-sized coaches and the like and obtain clear fluoroscopic images having structure layering information and material information, so as to quickly and efficiently inspect the subjects that may contain contrabands, hazardous articles, and prohibited articles.

The dual-channel high-energy X-ray fluoroscopic imaging system according to the embodiments of the present invention may simultaneously perform fluoroscopic imaging on the subjects in two inspection channels using only one electron accelerator, two sets of X-ray beams and two sets of detector systems, through the design of the electron accelerator, the shielding and collimating device, the first detector array, the second detector array and various mechanical composite structures, and has advantages as follows: the two channels are inspected simultaneously, and the speed is fast; only one electron accelerator is used, the structure is simple and the cost is low; instead of Cobalt-60, the electron accelerator is used as the ray source, and the security reliability is higher; more sets of X-ray beams may be extracted through the design of the collimators, and a dual-view-angle function may be realized to enable the hierarchical visibility of the fluoroscopic image; X-ray beams with different energy may be extracted, to realize the material recognition of the subjects; and a dual-channel/dual-energy/dual-view-angle high-energy X-ray fluoroscopic imaging system with integrated multifunction may be realized. Furthermore, the X-ray beam in the present invention has a number of advantages in the planar fan-shaped region thereof, such as small energy spread, uniform intensity distribution, small target point, and being able to be extracted at a large angle, etc. The image quality of the X-ray fluoroscopic imaging system can be improved. The dual-channel high-energy X-ray fluoroscopic imaging system according to the present invention can be designed in specific forms of a stationary type, an assembled type, a track mobile type or vehicular mobile type, etc., and has advantages such as simple structure, low cost, strong function, good image quality and the like.

While the present invention has been illustrated and described in the accompanying drawings and the above description, such illustration and description is to be treated as being illustrative or exemplary, rather than being limitative. The present invention is not limited to the disclosed embodiments.

For example, as the above-described electron accelerator, the present invention is not limited to adopt the single-energy accelerator, but also can adopt a dual-energy accelerator or a multi-energy accelerator.

For example, while the X-ray fluoroscopic imaging system of the present invention has been described in the context of only two inspection channels in the above embodiments, the present invention is not limited to the case of only two inspection channel. It would be understood by those skilled in the art that, according to the principle and concept of the present invention, the X-ray fluoroscopic imaging system in the above embodiments can be readily adapted to the application with more than two inspection channels.

For example, while the above embodiments describe the cases of disposing the two inspection channels respectively on both sides of the electron accelerator, the present invention is not limited to such arrangement of the inspection channels. It would be understood by those skilled in the art that, according to the principle and concept of the present invention, the X-ray fluoroscopic imaging system in the above embodiments can be readily adapted to the application with two or more inspection channels respectively disposed on a same side or different sides of the electron accelerator. For example, a plurality of inspection channels may be disposed on a same side of the electron accelerator. Alternatively, one or more of the inspection channels may be disposed on either of the right side, the left side and the front side of the electron accelerator, and the other inspection channels may be disposed on the other(s) of the right side, the left side and the front side of the electron accelerator.

When implementing the invention claimed herein, those skilled in the art are able to understand and implement other variation of the disclosed embodiments, by studying the drawings, disclosure, and the accompanying claims. In the claims, the term "comprise" or "include" is not intended to exclude other elements or steps. The pure facts of particular measures recited in the dependent claims that are different from each other do not indicate that the combination of these measures cannot be utilized advantageously. Any numerals in the claims are not to be interpreted as a limitation to the scope.

What is claimed is:

1. An X-ray fluoroscopic imaging system for fluoroscopic imaging subjects in at least two inspection channels, comprising:
   an electron accelerator,
   a shielding and collimating device,
   at least two detector arrays,
   wherein, the electron accelerator includes an electron emitting unit, an electron accelerating unit and a target;
   wherein, the shielding and collimating device includes a shielding structure and at least two collimators respectively corresponding to the at least two detector arrays;
   wherein, each of the at least two detector arrays, the collimator corresponding to this detector array and a target point targeted by the electric beam are located in one plane;
   wherein, each of the at least two collimators is a slit with a uniform thickness, so as to extract a planar fan-shaped X-ray beam with a uniform intensity distribution;
   wherein, each of the detector arrays is in an arc shape which takes the target point as the arc center;
   wherein, the X-ray beam has a downward field angle of 15° (−15°) and a upward field angle of 75° (+75°) with respect to the horizontal plane (0°).

2. The X-ray fluoroscopic imaging system according to claim 1,
   wherein the at least two inspection channels comprise a first inspection channel and a second inspection channel, the at least two detector arrays comprise first and second detector arrays respectively corresponding to the first and second inspection channels, the at least two collimators comprise first and second collimators respectively corresponding to the first and second detector arrays;
   wherein the first and second collimators are disposed on both sides of the axis of the electron beam respectively, and the first inspection channel and the second inspection channel are disposed on both sides of the electron accelerator respectively;
   wherein, the first collimator, the first detector array and the target point targeted by the electric beam are located in a first plane, and the second collimator, the second detector array and the target point targeted by the electric beam are located in a second plane.

3. The X-ray fluoroscopic imaging system according to claim 2, wherein the first plane and the second plane respectively form a first angle and a second angle with respect to the axis of the electron beam, and a first X-ray beam and a second X-ray beam with uniform intensity distributions are respectively extracted in the first plane and the second plane.

4. The X-ray fluoroscopic imaging system according to claim 3, wherein the first angle and the second angle are equal in magnitude, and the first X-ray beam and the second X-ray beam are symmetrical.

5. The X-ray fluoroscopic imaging system according to claim 2, wherein an angle between the axis of the electron accelerator and the first inspection channel and an angle between the axis of the electron accelerator and the second inspection channel are both less than 60°.

6. The X-ray fluoroscopic imaging system according to claim 5, wherein the axis of the electron accelerator is parallel to the first inspection channel and the second inspection channel.

7. The X-ray fluoroscopic imaging system according to claim 2, wherein an angle formed between the first plane and the first channel and an angle formed between the second plane and the second channel are both greater than 45°.

8. The X-ray fluoroscopic imaging system according to claim 7, wherein the angle formed between the first plane and the first channel and the angle formed between the second plane and the second channel are both 90°.

9. The X-ray fluoroscopic imaging system according to claim 2, further comprising at least one transferring device, which is mounted in the first inspection channel and/or the second inspection channel, and used to drag an subject to pass through the region radiated by the X-ray at a set speed.

10. The X-ray fluoroscopic imaging system according to claim 2, further comprising:
    a device chamber, which is fixed on the ground between the first inspection channel and the second inspection channel, and in which the electron accelerator and the shielding and collimating device are mounted;
    at least one transferring device, which is mounted in the first inspection channel and/or the second inspection channel, and used to drag the subject to pass through the region radiated by the X-ray at a set speed;
    a first detector arm support, which is located outside the first inspection channel and in which a first detector array is mounted, such that the first detector array is located in the first plane in which the first collimator is located;
    a second detector arm support, which is located outside the second inspection channel and in which a second detector array is mounted, such that the second detector array is located in the second plane in which the second collimator is located; and
    a control chamber, in which the power supply and control subsystem and the signal analysis and image processing subsystem are mounted;
    wherein, a whole cross section of the X-ray fluoroscopic imaging system shows a Ω-shaped structure.

11. The X-ray fluoroscopic imaging system according to claim 2, mountable on a chassis; the X-ray fluoroscopic imaging system further comprises at least an X-ray source cabin, a device cabin, an operating cabin, a first arm support system and a second arm support system; wherein:
    the electron accelerator and the shielding and collimating device are mounted in the X-ray source cabin, a first X-ray beam is extracted towards one side of the chassis by the first collimator, and a second X-ray beam is extracted towards the other side of the chassis by the second collimator;
    the first arm support system includes the first detector array; in its operating state, the first arm support system is unfolded on one side of the chassis and forms a 'gate-type' structure with the chassis, and the first detector array is located in the first plane in which the first collimator is located; and in its non-operating state, the first arm support system is folded and stored on the top of the chassis;
    the second arm support system includes the second detector array; in its operating state, the second arm support system is unfolded on the other side of the chassis and forms a 'gate-type' structure with the chassis, and the second detector array is located in the second plane in which the second collimator is located; and in its non-operating state, the second arm support system is folded and stored on the top of the chassis;

the power supply and control subsystem, and the signal analysis and image processing subsystem are mounted in the device cabin; and in the operating cabin, a device for system operation and office is mounted.

12. The X-ray fluoroscopic imaging system according to claim 2, mountable on a chassis; the X-ray fluoroscopic imaging system further comprises at least an X-ray source cabin, a device cabin, an operating cabin, a first arm support system, a second arm support system, a third arm support system and a fourth arm support system; wherein:

the electron accelerator and the shielding and collimating device are mounted in the X-ray source cabin, and the shielding and collimating device further comprises third and fourth collimators, the first and third collimators are arranged in different angles with respect to the target and are configured to guide out a first X-ray beam and a third X-ray beam having different energy and different angles towards one side of the chassis respectively, and the second and fourth collimators are arranged in different angles with respect to the target and are configured to guide out a second X-ray beam and a fourth X-ray beam having different energy and different angles towards the other side of the chassis respectively;

the first arm support system includes a first low-energy detector array; in its operating state, the first arm support system is unfolded on one side of the chassis and forms a 'gate-type' structure with the chassis, and the first low-energy detector array is located in the first plane in which the first collimator is located; in its non-operating state, the first arm support system is folded and placed on the top of the chassis;

the third arm support system includes a first high-energy detector array; in its operating state, the third arm support system is unfolded on the one side of the chassis and forms a 'gate-type' structure with the chassis, and the first high-energy detector array is located in a third plane in which the third collimator is located; in its non-operating state, the third arm support system is folded and placed on the top of the chassis;

the two "gate-type" structures formed by the first and third arm support systems with the chassis, one of the structures in front of the other, constitute the first inspection channel;

the second arm support system includes a second low-energy detector array; in its operating state, the second arm support system is unfolded on the other side of the chassis and forms a 'gate-type' structure with the chassis, and the second low-energy detector array is located in the second plane in which the second collimator is located; in its non-operating state, the second arm support system is folded and placed on the top of the chassis;

the fourth arm support system includes a second high-energy detector array; in its operating state, the fourth arm support system is unfolded on the other side of the chassis and forms a 'gate-type' structure with the chassis, and the second high-energy detector array is located in a fourth plane in which the fourth collimator is located; in its non-operating state, the fourth arm support system is folded and placed on the top of the chassis;

the two "gate-type" structures formed by the second arm support system and the fourth arm support system with the chassis, one of the structures in front of the other, constitute the second inspection channel;

the power supply and control subsystem, and the signal analysis and image processing subsystem are mounted in the device cabin; and in the operating cabin, a device for system operation and office is mounted.

13. The X-ray fluoroscopic imaging system according to claim 1, wherein the detector array consists of a plurality of detectors arranged in one or more rows.

14. The X-ray fluoroscopic imaging system according to claim 1, further comprising a first detector arm support and a second detector arm support, for mounting and fixing the detectors;

wherein the detector arm supports are tubular, and protect the detectors mounted therein; the detector arm supports have openings in positions corresponding to the end surfaces of the detectors, so as not to obstruct the direct arrival of X-ray to the end surfaces of the detectors.

15. The X-ray fluoroscopic imaging system according to claim 14, further comprising a connecting and fixing device, used to connect and fix the first detector arm support and the second detector arm support.

16. The X-ray fluoroscopic imaging system according to claim 14, wherein a whole cross section of the X-ray fluoroscopic imaging system shows a Π-shaped, M-shaped or Ω-shaped structure.

17. The X-ray fluoroscopic imaging system according to claim 14, further comprising a first adjustable fixing device and a second adjustable fixing device, for fixing the first detector arm support and the second detector arm support on the ground respectively, and adjusting flexibly the location of the detector arm supports and the direction of the openings, such that the first detector array is located in the first plane and the second detector array is located in the second plane; and the whole cross section of the X-ray fluoroscopic imaging system shows a III-shaped structure.

18. The X-ray fluoroscopic imaging system according to claim 1, further comprising a device chamber in which the electron accelerator is mounted and fixed, for providing a temperature and humidity operating environment.

19. The X-ray fluoroscopic imaging system according to claim 18, wherein the first detector arm support and the second detector arm support are fixedly connected to the device chamber, such that the first detector array is located in the first plane and the second detector array is located in the second plane.

20. The X-ray fluoroscopic imaging system according to claim 1, further comprising a control chamber, for providing a place for the operations of devices for an operator of the system.

21. The X-ray fluoroscopic imaging system according to claim 1, further comprising an anti-scattering shield arranged on one or both sides of the inspection channels, for shielding the reflected rays and the scattered rays formed when the X-ray penetrates the subject, so as to ensure the safety of the operator and the public.

22. The X-ray fluoroscopic imaging system according to claim 1, further comprising a sloping stage for raising up the subject, and enabling any portion of the section of the subject to be within the coverage of the first X-ray beam or the second X-ray beam.

23. A vehicle comprising the X-ray fluoroscopic imaging system according to claim 1.

* * * * *